United States Patent
Roig et al.

(10) Patent No.: US 11,982,400 B2
(45) Date of Patent: May 14, 2024

(54) HEAD CRADLE FOR HEAD-MOUNTED DISPLAY AND RELATED SYSTEMS AND DEVICES

(71) Applicant: META PLATFORMS TECHNOLOGIES, LLC, Menlo Park, CA (US)

(72) Inventors: Enric Vial Roig, Seattle, WA (US); Joel Bernard Jacobs, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 293 days.

(21) Appl. No.: 17/377,435

(22) Filed: Jul. 16, 2021

(65) Prior Publication Data
US 2022/0042646 A1 Feb. 10, 2022

Related U.S. Application Data

(60) Provisional application No. 63/060,716, filed on Aug. 4, 2020.

(51) Int. Cl.
F16M 13/04 (2006.01)

(52) U.S. Cl.
CPC ................... F16M 13/04 (2013.01)

(58) Field of Classification Search
CPC ......... A42B 3/145; A42B 3/085; A42B 3/142; A42B 1/22; G02B 27/0176; G02B 27/0154; Y10T 24/2187
See application file for complete search history.

(56) References Cited

U.S. PATENT DOCUMENTS

| | | | | |
|---|---|---|---|---|
| 5,950,245 A | * | 9/1999 | Binduga | A42B 3/145 24/68 B |
| 6,652,469 B2 | * | 11/2003 | Pinsonnault | A61B 5/113 600/595 |
| 7,369,174 B2 | | 5/2008 | Olita et al. | |

(Continued)

FOREIGN PATENT DOCUMENTS

| | | |
|---|---|---|
| DE | 202019103344 U1 | 6/2019 |
| EP | 2937005 B1 | 1/2018 |

(Continued)

OTHER PUBLICATIONS

JP H11324940 with translation (Year: 1999).*
International Search Report and Written Opinion for International Application No. PCT/US2021/044233, dated Oct. 29, 2021, 15 pages.
International Search Report and Written Opinion for International Application No. PCT/US2021/035530, dated Oct. 22, 2021, 15 pages.
Invitation to Pay Additional Fees received for International Application No. PCT/US2021/035530, dated Sep. 1, 2021, 9 pages.

(Continued)

*Primary Examiner* — Adam J Waggenspack
(74) *Attorney, Agent, or Firm* — Greenberg Traurig, LLP

(57) ABSTRACT

The disclosed head cradle may include a flexible portion that is configured to conform to an occipital region of a user's head and a base portion comprising at least one mounting element that is configured to secure the head cradle to a head strap for supporting a head-mounted display, a first biasing element secured to a first side of the flexible portion, and a second biasing element secured to a second, opposite side of the flexible portion, wherein the first and second biasing elements are configured to allow the flexible portion to conform to the occipital region of the user's head when a force substantially normal to the user's head is applied to the base portion. Various other devices, methods, and systems are also disclosed.

20 Claims, 12 Drawing Sheets

(56) References Cited

U.S. PATENT DOCUMENTS

| | | |
|---|---|---|
| 7,707,695 B2 | 5/2010 | Dubois |
| 9,622,535 B2 * | 4/2017 | Windham ............... A42B 3/145 |
| 9,837,682 B1 | 12/2017 | Nikkhoo et al. |
| 9,864,406 B2 * | 1/2018 | Miller ................... G06F 1/1637 |
| 10,251,289 B2 | 4/2019 | Chen et al. |
| 10,502,363 B2 * | 12/2019 | Edwards ................ F16M 13/04 |
| 10,746,351 B1 * | 8/2020 | Ellis ................... G02B 27/0176 |
| 10,774,987 B2 | 9/2020 | Xu et al. |
| 11,163,333 B2 | 11/2021 | Lin et al. |
| 11,300,999 B1 * | 4/2022 | Kadirvel ............... G06F 1/1635 |
| 2005/0128735 A1 | 6/2005 | Atkins et al. |
| 2012/0297520 A1 * | 11/2012 | Gleason ................. A42B 3/142 2/181 |
| 2019/0037715 A1 | 1/2019 | Chen et al. |
| 2019/0339736 A1 * | 11/2019 | Chang ................... A42B 3/145 |
| 2021/0315301 A1 | 10/2021 | Wang et al. |

FOREIGN PATENT DOCUMENTS

| | | |
|---|---|---|
| JP | H11324940 A * | 11/1999 |
| WO | 2020021951 A1 | 1/2020 |

OTHER PUBLICATIONS

International Preliminary Report on Patentability for International ApplicationNo. PCT/US2021/044233, dated Feb. 16, 2022, 13 pages.

International Preliminary Report on Patentability for International Application No. PCT/US2021/035530, dated Dec. 15, 2022, 12 pages.

* cited by examiner

HEAD CRADLE FOR HEAD-MOUNTED DISPLAY AND RELATED SYSTEMS AND DEVICES

CROSS-REFERENCE TO RELATED APPLICATION

This application claims the benefit of U.S. Provisional Patent Application No. 63/060,716, titled "HEAD CRADLE FOR HEAD-MOUNTED DISPLAY AND RELATED SYSTEMS AND DEVICES," filed 4 Aug. 2020, the entire disclosure of which is incorporated herein by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
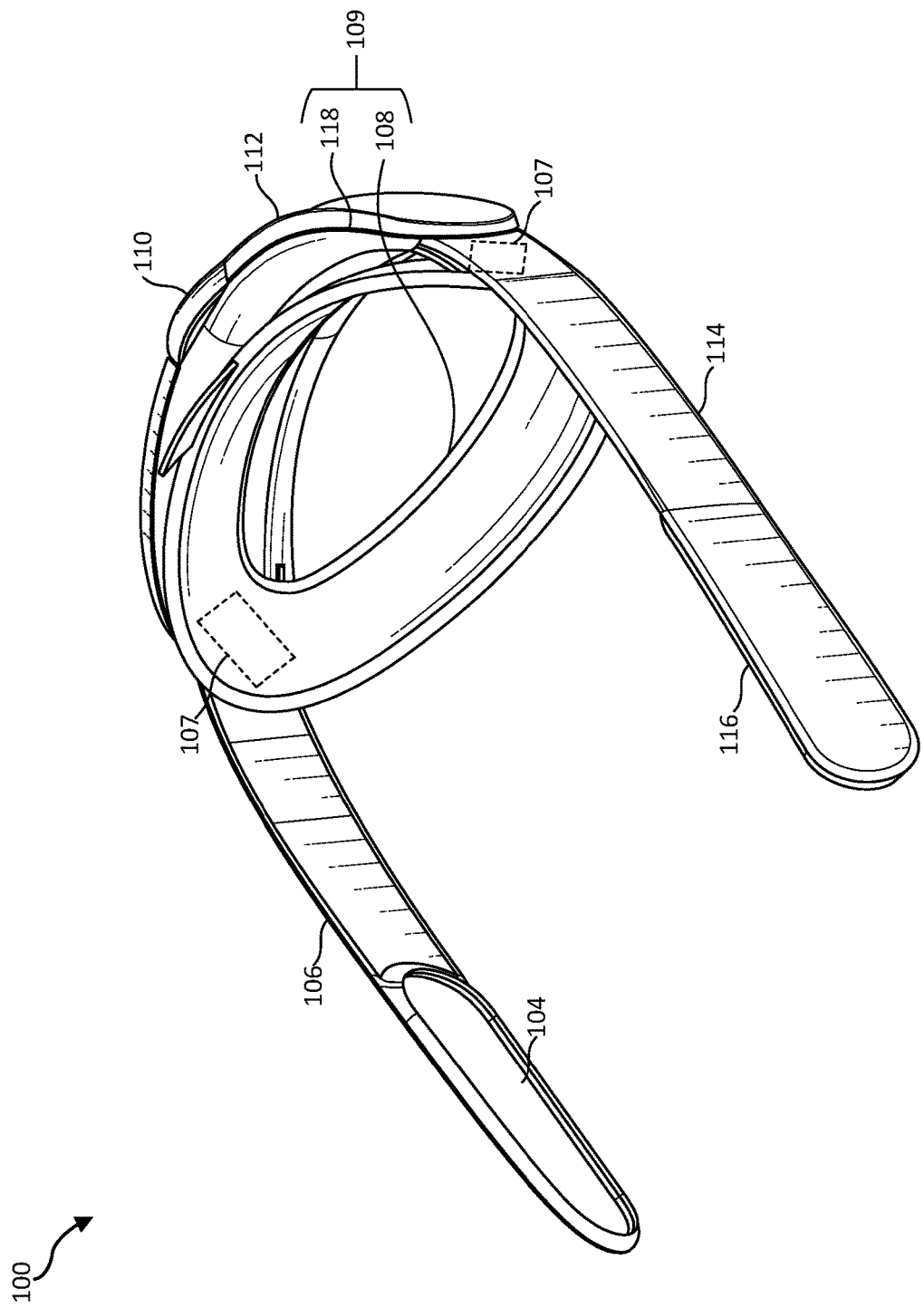
FIG. 1 is a perspective view of an adjustable band for a head-mounted display, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

A traditional adjustable band for a head-worn device (e.g., a head-mounted display (HMD)) may include a foam cushion on a rear portion of the adjustable band to conform to the user's (e.g., the wearer's) head when securing the HMD to the user's head. However, the foam cushion may have undesirable effects on the user. For example, the foam cushion may compress unevenly against the user's head or the foam cushion may not retain a shape required to support the user's head. The foam cushion of a traditional adjustable band may be covered in a plastic or vinyl covering that may create discomfort (e.g., sweating) for the user. In addition, a traditional adjustable band may not comfortably (e.g., evenly) distribute tensioning forces on the user when the straps of the adjustable band are tightened.

Some embodiments of the present disclosure may provide advantages over traditional adjustable band systems, such as allowing the adjustable band to conform to the shape of the user's head when the straps are tightened. Embodiments of the present disclosure relate to a head cradle for an adjustable band system. Embodiments of the present disclosure may allow the user to adjust a position of an adjustment knob on the adjustable band system to set the proper tension for the user when donning an HMD. When under tension, a head cradle on the adjustable band may conform to the rear portion (e.g., the occipital region) of the user's head. Embodiments of the present disclosure allow the head cradle to conform to the user's head based on a flexible portion of the head cradle that distributes the tension across the surface of the flexible portion that contacts the user's head. Biasing elements (e.g., leaf springs) of a base portion of the head cradle may flex under the applied tension and support the flexible portion. The head cradle may provide a comfortable fit for the user when donning an HMD attached to the adjustable band system. The comfortable fit provided by the head cradle may enable the user to wear the HMD and adjustable band for extended periods of time without discomfort.

Figure 4:
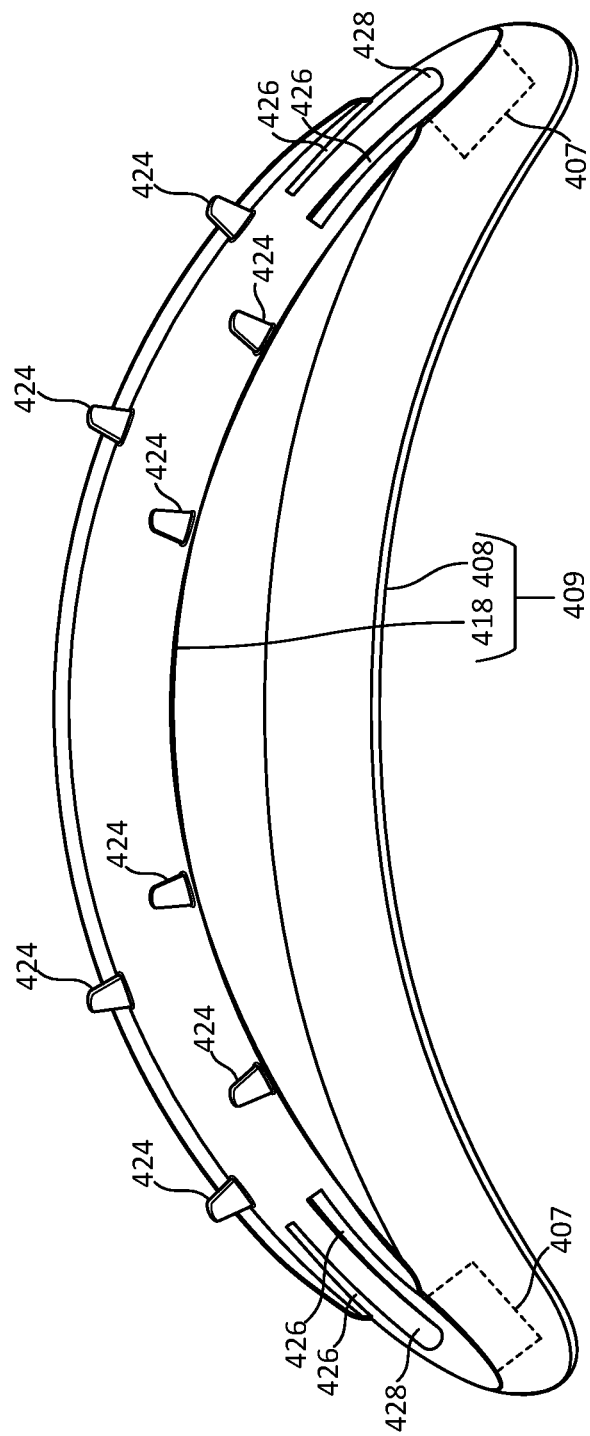
FIG. 4 is a perspective view of a head cradle for an adjustable band, according to at least one embodiment of the present disclosure.
Figure 5A:
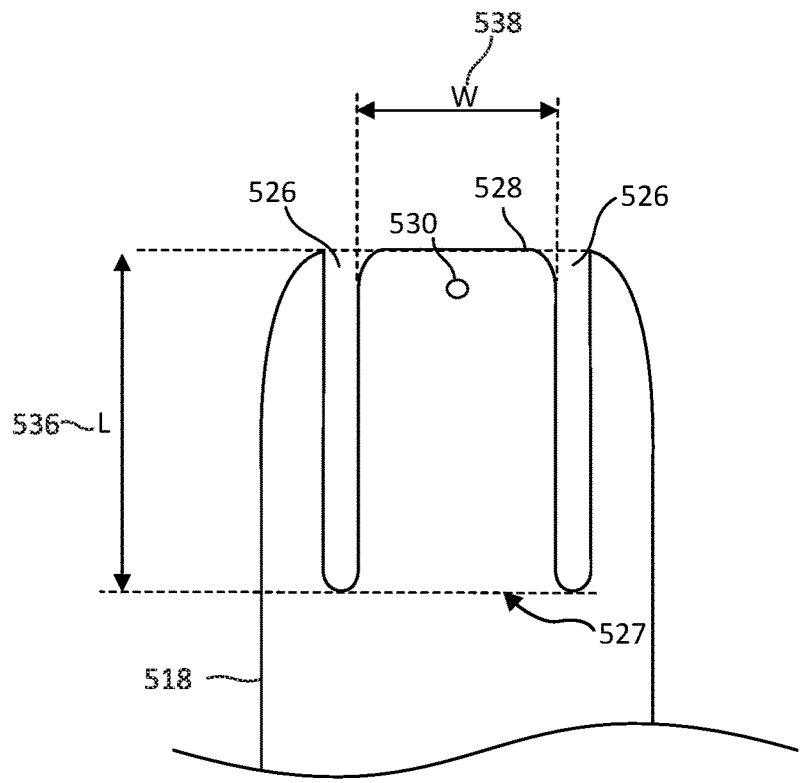
FIG. 5A is a partial view of an example base portion of a head cradle, according to at least one embodiment of the present disclosure.
Figure 5B:
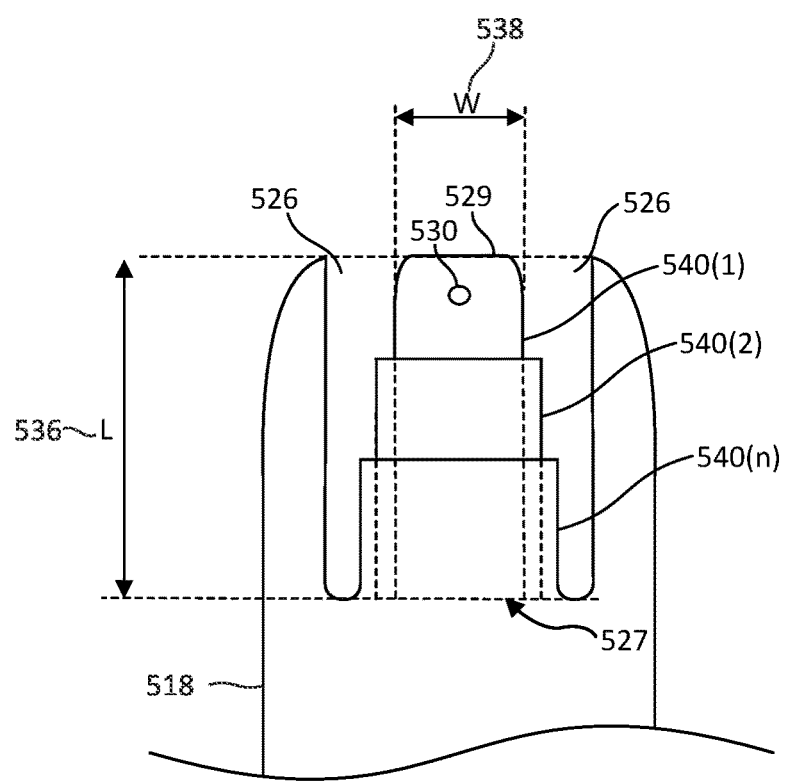
FIG. 5B is a partial view of an example telescoping base portion of a head cradle, according to at least one embodiment of the present disclosure.
Figure 6:
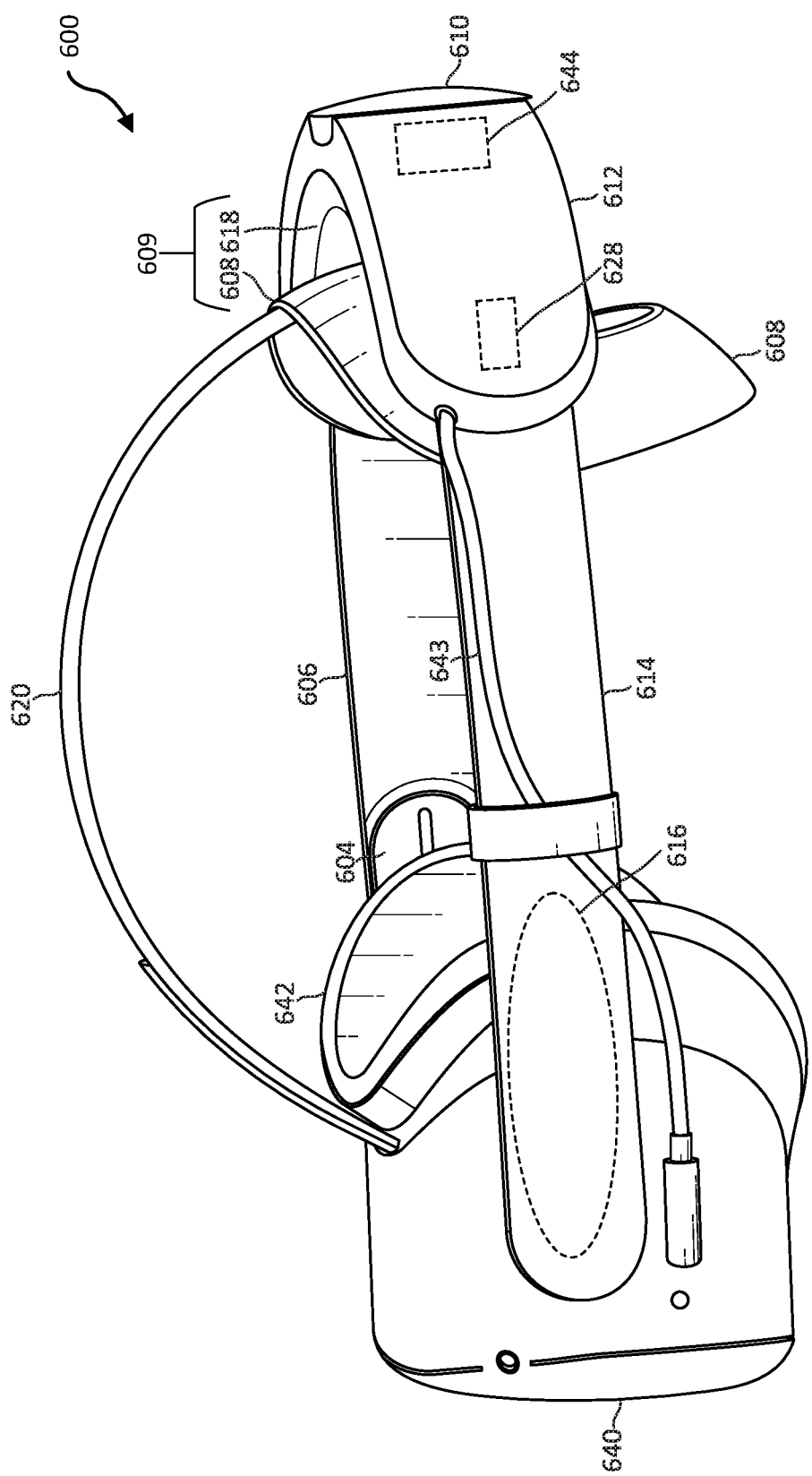
FIG. 6 is a side view of an adjustable band attached to a head-mounted display, according to at least one embodiment of the present disclosure.

The following will provide, with reference to FIGS. 1-11, detailed descriptions of a head cradle for an HMD including related devices and systems. A description of an adjustable band including a head cradle is presented in reference to FIGS. 1-3. A description of mounting elements for securing the head cradle to an adjustable band is presented in reference to FIG. 4. FIG. 5A illustrates details of a biasing element for a head cradle. FIG. 5B illustrates details of a telescoping biasing element for a head cradle. FIG. 6 illustrates an HMD with a detachable, adjustable band and head cradle. FIGS. 7-11 illustrate various types of example artificial-reality devices that may be used with a head cradle for an HMD.

FIG. 1 is a perspective view of an adjustable band 100 for a head-mounted display (HMD), according to at least one embodiment of the present disclosure. Adjustable band 100 may include a head cradle 109 that conforms to the user's head when the user dons adjustable band 100. Head cradle 109 may provide a comfortable and secure interface between the user's head and adjustable band 100. Head cradle 109 may increase user comfort that may be associated with wearing adjustable band 100 attached to an HMD for an extended period of time. Head cradle 109 may include a flexible portion 108 that may be positioned and shaped to contact the rear portion (e.g., the occipital region) of the user's head. Flexible portion 108 may include a material having an elastic modulus that allows flexible portion 108 to conform to the occipital region of the user's head. Examples of materials included in flexible portion 108 may include, without limitation, thermoplastic polyurethane (TPU) material, two-part expanding foam, silicone, polymer, natural rubber, resin, PVC, silflex, latex, urethane, elastomer, and crystal silicone. In some examples, flexible portion 108 may include an injection molded TPU material. Flexible portion 108 material may exhibit antimicrobial and/or hypo-allergenic properties.

Head cradle 109 may include a base portion 118 that secures head cradle 109 to a tensioning device 112. As will be described in detail below with reference to FIG. 4, base portion 118 may be secured to tensioning device 112 by mounting elements (e.g., protrusions, tabs, etc.) in base portion 118 secured to tensioning device 112. In some examples, flexible portion 108 may be secured to base portion 118 solely using rigid inserts 107. Rigid inserts 107 may include a rigid material (e.g., aluminum, acrylonitrile butadiene styrene (ABS), metal, steel, etc.) that is embedded into flexible portion 108. Rigid inserts 107 may be embedded into flexible portion 108 during the process of manufacturing flexible portion 108. For example, rigid inserts 107 may be inserted into a mold prior to injecting a TPU material into the mold. After the TPU has cured, rigid inserts 107 may be securely embedded on opposite lateral sides of flexible portion 108. Rigid inserts 107 may include a threaded screw hole(s) and a ribbed portion. A fastener (e.g., a screw) may be inserted through a hole in base portion 118 into the threaded screw hole(s) to secure flexible portion 108 to base portion 118. Additionally or alternatively, the ribbed portion of rigid inserts 107 may be secured to base portion 118 by application of an adhesive (e.g. a glue) between the ribbed portion of rigid inserts 107 and base portion 118. The presence of ribs in the ribbed portion of rigid inserts 107 may increase a surface area of rigid inserts 107 compared to a planar configuration, to improve adhesion between rigid inserts 107 and the material of flexible portion 108.

Adjustable band 100 may be configured to attach to/detach from an HMD. Adjustable band 100 may include a right side arm 106 that may be attached, affixed, connected, or otherwise coupled to an HMD (e.g., HMD 640 of FIG. 6, front rigid body 802 of FIG. 8, or HMD 1002 of FIG. 10). In some examples, a snap piece assembly 104 may be connected to the right side arm 106 and configured to connect an end of adjustable band 100 to the HMD. Similarly, adjustable band 100 may include a left side arm 114 that may be attached, affixed, connected, or otherwise coupled to an HMD (e.g., HMD 640 of FIG. 6, front rigid body 802 of FIG. 8, or HMD 1002 of FIG. 10). In some examples, a snap piece assembly 116 may be connected to left side arm 114 and configured to connect the other end of adjustable band 100 to the HMD.

In some examples, flexible portion 108 may conform to the rear portion of the user's head when a force is applied to base portion 118. For example, a force substantially normal to the user's head and in a direction towards the rear of the user's head may be applied by tensioning device 112. A user may don adjustable band 100 attached to an HMD. The user may adjust the tension of the adjustable band 100 by adjusting a position (e.g., rotating, sliding, etc.) of adjustment knob 110. An increase in tension on adjustable band 100 may increase a force between flexible portion 108 and the rear portion of the user's head that contacts flexible portion 108. Flexible portion 108 may conform to the shape of the rear portion of the user's head and distribute the force substantially even across an inner surface of flexible portion 108 that contacts the rear portion of the user's head. An even distribution of force across the surface of flexible portion 108 may result in a comfortable fit of adjustable band 100 for the user.

Figure 2:
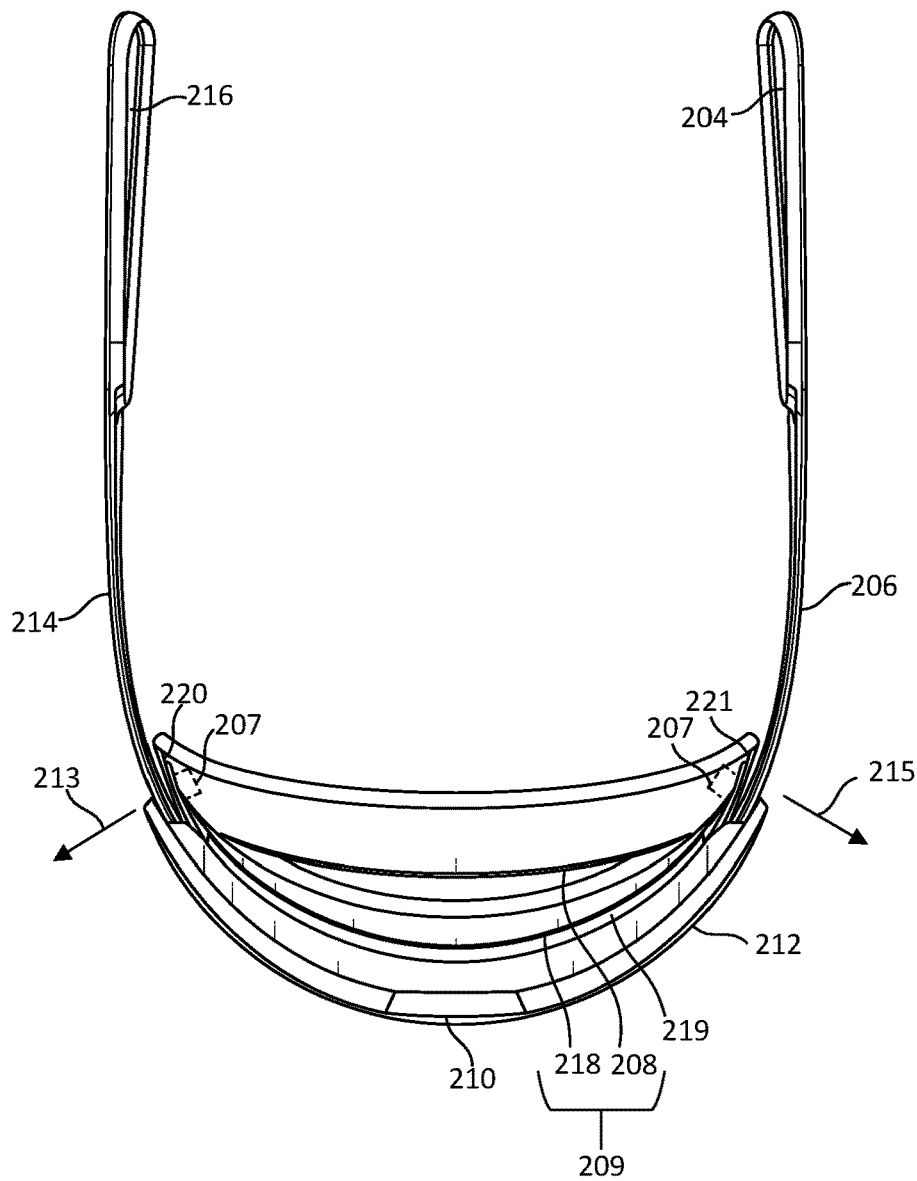
FIG. 2 is a plan view of an adjustable band for a head-mounted display, according to at least one embodiment of the present disclosure.

FIG. 2 is a plan view of an adjustable band 200 for an HMD, according to at least one embodiment of the present disclosure. Adjustable band 200 may include a head cradle 209 that conforms to the user's head when the user dons adjustable band 200 attached to an HMD. Head cradle 209 may provide a comfortable and secure interface between the user's head and adjustable band 200. Head cradle 209 may include a flexible portion 208 that contacts the rear portion (e.g., the occipital region) of the user's head when the adjustable band 200 is worn by the user. Flexible portion 208 may include a material having an elastic modulus that allows flexible portion 208 to conform to the occipital region of the user's head. The material used in flexible portion 208 may have an elastic modulus in the range of less than 0.01 GPa, about 0.01 to 0.1 GPa, about 0.1 to 1 GPa, or about 1 to 5 GPa. In some examples, flexible portion 208 may include a thermoplastic elastomer (e.g. a TPU) material. Flexible portion 208 may be produced using any of a variety of methods, including, without limitation, injection molding, 3-D printing, casting, vacuum forming, or thermoforming. In some examples, flexible portion 208 may have a finish (e.g., elastomeric paint, paint, etc.) applied to the surface of flexible portion 208.

Head cradle 209 may include a base portion 218 that secures head cradle 209 to a tensioning device 212. As will be described in detail below with reference to FIG. 4, base portion 218 may be secured to tensioning device 212 by mounting elements (e.g., protrusions, tabs, etc.). In some examples, flexible portion 208 may be secured to base portion 218 solely using rigid inserts 107. Rigid inserts 207 may include a rigid material (e.g., aluminum, ABS, metal, steel, etc.) that is embedded into flexible portion 208. Rigid inserts 207 may be secured to biasing elements 220, 221 of base portion 218. Rigid inserts 207 may include a threaded screw hole(s) and a ribbed portion. A fastener (e.g., a screw) may be inserted through a hole in biasing elements 220, 221 into the threaded screw hole(s) to secure flexible portion 208 to biasing elements 220, 221 of base portion 218. Additionally or alternatively, the ribbed portion of rigid inserts 207 may be secured to biasing elements 220, 221 of base portion 218 by application of an adhesive (e.g. a glue) between the ribbed portion of rigid inserts 107 and biasing elements 220, 221.

As described with reference to FIG. 1, adjustable band 200 may be configured to attach to/detach from an HMD. Adjustable band 200 may include right side arm 206 and left side arm 214 that may be attached, affixed, connected, or otherwise coupled to an HMD (e.g., HMD 640 of FIG. 6, front rigid body 802 of FIG. 8, HMD 1002 of FIG. 10) via snap piece assembly 204 and snap piece assembly 216.

Base portion 218 may include a left side (as viewed from the perspective of FIG. 2) biasing element 220 and a right side (as viewed from the perspective of FIG. 2) biasing element 221. Left side biasing element 220 and right side biasing element 221 may bias flexible portion 208 to a resting (e.g., neutral) position when no tension is applied by tensioning device 212 (e.g., when no force is applied to flexible portion 208). When a user dons adjustable band 200 attached to an HMD and tension is applied to right side arm 206 and/or left side arm 214 (e.g., a tension applied by adjusting a position (e.g., rotating, sliding, etc.) of adjustment knob 210), the force of the user's rear head portion against flexible portion 208 may cause left side biasing element 220 and/or right side biasing element 221 to flex and/or move. Left side biasing element 220 may flex in a direction substantially parallel to a direction indicated by arrow 213 in FIG. 2. Right side biasing element 221 may flex in a direction substantially parallel to a direction indicated by arrow 215.

In some examples, an air gap 219 may be formed between flexible portion 208 and tensioning device 212. Left side biasing element 220 and right side biasing element 221 may flex within the space provided by air gap 219. In some examples, left side biasing element 220 and right side biasing element 221 may include a leaf spring, a quarter elliptic spring, a simple beam spring, a cantilever spring, a plate spring, a torsion spring, a compression spring, a spiral spring, or a combination thereof. For example, left side biasing element 220 and right side biasing element 221 may include a leaf spring (e.g., a cantilever spring) that is fixed on one end to base portion 218 and movable on an opposite end that is attached to flexible portion 208. As will be described in detail with reference to FIG. 5A, left side biasing element 220 and right side biasing element 221 may include dimensions and materials that allow left side biasing element 220 and right side biasing element 221 to flex (e.g., bend) when a force is applied to flexible portion 208. A flexing of left side biasing element 220 and right side biasing element 221 may create a substantially even distribution of force across the surface of flexible portion 208. A substantially even distribution of force across the surface of flexible portion 208 against a rear portion of the user's head may create a comfortable fit of adjustable band 200 for the user.

Figure 3:
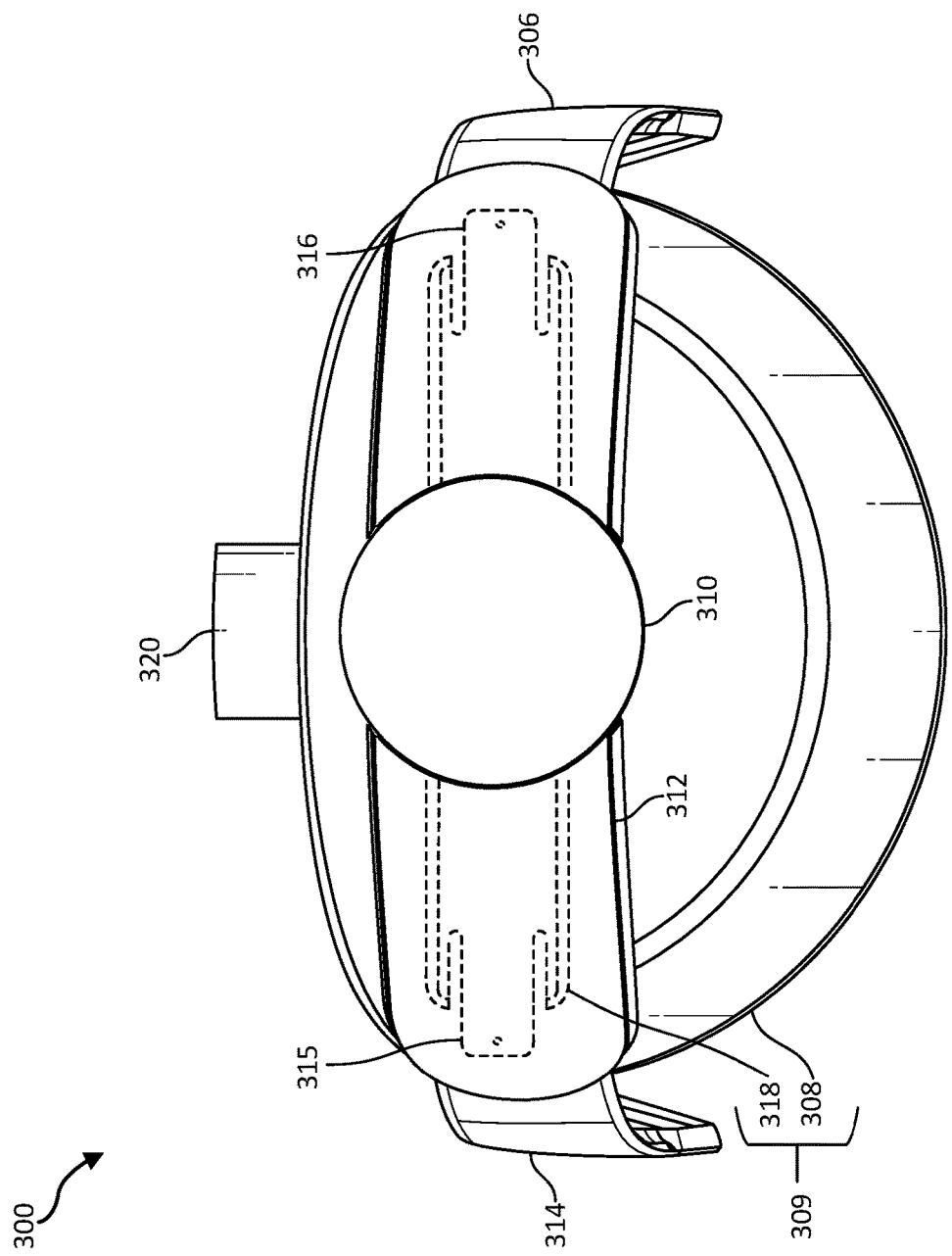
FIG. 3 is a rear view of an adjustable band for a head-mounted display, according to at least one embodiment of the present disclosure.

FIG. 3 is a rear view of an adjustable band 300 for an HMD, according to at least one embodiment of the present disclosure. Adjustable band 300 may include a head cradle 309 that conforms to the user's head when the user dons adjustable band 300 attached to an HMD. Head cradle 309 may provide a comfortable and secure interface between the user's head and adjustable band 300. Head cradle 309 may include a flexible portion 308 that contacts the rear portion (e.g., the occipital region) of the user's head. Flexible portion 308 may include a material having an elastic modulus that allows flexible portion 308 to conform to the occipital region of the user's head. In some examples, flexible portion 308 may include a TPU material. As shown in FIG. 3, flexible portion 308 may include a loop shape that substantially surrounds the occipital region of the user's head. The loop shape may be configured to provide a surface area that contacts the occipital region of the user's head providing a comfortable fit.

Head cradle 309 may include a base portion 318 that secures head cradle 309 to a tensioning device 312. The base portion 318 may include a left side biasing element 315 and a right sight biasing element 316 in the form of leaf springs. Tensioning device 312 may include adjustment knob 310. Rotation of adjustment knob 310 may cause a length adjustment mechanism (e.g., a rack and pinion mechanism not shown in FIG. 3) within tensioning device 312 to increase and/or decrease the length of left strap 314 and/or right strap 306. A pinion gear connected to adjustment knob 310 may be configured and positioned to engage (e.g., mesh with) the gear teeth of a first rack and a second rack such that rotation of the pinion gear causes lateral motion of the first rack and the second rack. For example, when adjustment knob 310 is rotated in an engaging direction, the pinion gear may rotate in a counterclockwise direction (as viewed from the perspective of FIG. 3) such that the first rack and the second rack move in a direction that increases the tension on left strap 314 and/or right strap 306 by decreasing the length of left strap 314 and/or right strap 306. Similarly, when adjustment knob 310 is rotated in a disengaging direction, the pinion gear may rotate in a clockwise direction (as viewed from the perspective of FIG. 3) such that rotation of the pinion gear causes lateral motion of the first rack and the second rack. In some examples, when adjustment knob 310 is rotated in an engaging direction, the pinion gear may rotate in a clockwise direction (as viewed from the perspective of FIG. 3) such that the first rack and the second rack move in a direction that increases the tension on left strap 314 and/or right strap 306 by decreasing the length of left strap 314 and/or right strap 306. Similarly, when adjustment knob 310 is rotated in a disengaging direction, the pinion gear may rotate in a counterclockwise direction (as viewed from the perspective of FIG. 3) such that rotation of the pinion gear causes lateral motion of the first rack and the second rack. This disengaging movement of the first rack and the second rack may cause a decrease in tension in adjustable band 300 by increasing the length of left strap 314 and/or right strap 306.

In some examples, adjustable band 300 may include an upper strap 320. A portion of upper strap 320 is shown in FIG. 3. As will be described in detail with reference to FIG. 6, upper strap 320 may be secured to an upper region of flexible portion 308 and extend to an upper portion of the HMD. Additionally or alternatively, upper strap 320 may be secured to an upper region of tensioning device 312 and extend to an upper portion of the HMD. Upper strap 320 may extend over a center portion of the user's head and provide additional support for adjustable band 300 and the HMD when worn by the user. In some examples, the HMD may be of a lightweight design such that upper strap 320 is not required to support the HMD and adjustable band 300. In this case, the HMD may be supported by adjustable band 300 and a facial interface of the HMD (e.g., facial interface cushion 642 of FIG. 6).

FIG. 4 is a perspective view of a head cradle 409 including a base portion 418 and a flexible portion 408, according to at least one embodiment of the present disclosure. As described above with reference to FIGS. 1-3, head cradle 409 may include base portion 418 that secures head cradle 409 to a tensioning device and flexible portion 408 that conforms to the occipital region of the user's head. Head cradle 409 may be secured to a strap tensioning device by mounting elements 424. Head cradle 409 may include any number of mounting elements 424. Mounting elements 424 may include any type of rigid material. Mounting elements 424 may include the same type of material as base portion 418. For example, mounting elements 424 and/or base portion 418 may be made of a variety of materials, including, without limitation, ABS, antimicrobial acrylonitrile styrene acrylester, carbon neutral bioplastic, polycarbonate, polyamide, polymethyl methacrylate, plexiglas, styrene ethylene butadiene styrene, or a combination thereof.

Head cradle 409 may be secured to a tensioning device by mounting elements 424 using an interference fit. The interference fit may be a fastening method between head cradle 409 and a tensioning device that is achieved by friction after head cradle 409 is inserted into a groove, channel, socket, recess, slot and/or other receiving mechanism in the tensioning device. Mounting elements 424 may be more flexible, pliable, deformable, and/or elastic than the engagement interface of the tensioning device that receives mounting elements 424 allowing mounting elements 424 to be inserted into the engagement interface of the tensioning device. In some examples, the engagement interface of the tensioning device may include a rigid element that enables mounting elements 424 to be inserted into the tensioning device and remain physically secure within the tensioning device. The tightness of the interference fit may be controlled by the amount of interference or the allowance amount. The amount of allowance may determine the strength of the fit. The allowance may be a dimension by which the engagement interface of the tensioning device is greater than mounting elements 424. The dimension of the allowance may be greater than about 1 micrometer, greater than about 10 micrometers, greater than about 100 micrometers, or greater than about 1 millimeter. In some examples, mounting elements 424 may include, without limitation, snap rivets, locking tabs, push rivets, lock pins, arrow fasteners, barbed fasteners, ribbed fasteners, spring snaps, T-slots, or a combination thereof.

In some examples, flexible portion 408 may be secured to base portion 418 using rigid inserts 407. Rigid inserts 407 may include a rigid material (e.g., aluminum, ABS, metal, steel, etc.) that is embedded into flexible portion 408. Rigid inserts 407 may be embedded into flexible portion 408 during the process of manufacturing flexible portion 408. For example, rigid inserts 407 may be inserted into a mold prior to injecting a TPU material into the mold. After the TPU has cured, rigid inserts 407 may be securely embedded on opposite, lateral sides of flexible portion 408 as shown in FIG. 4. Rigid inserts 407 may be secured to base portion 418 using any type of fastener(s). For example, rigid inserts 407 may include a threaded screw hole(s) and a ribbed portion. Base portion 418 may include biasing elements 428 (e.g., leaf springs) defined by slots 426 on either side of biasing elements 428. A fastener (e.g., a screw) may be inserted through a hole in biasing elements 428 into the threaded screw hole(s) of rigid inserts 407 to secure flexible portion 408 to base portion 418. Additionally or alternatively, the ribbed portion of rigid inserts 407 may be secured to base portion 418 by application of an adhesive (e.g. a glue) between the ribbed portion of rigid inserts 407 and biasing elements 428.

Base portion 418 may have a first degree of at least one physical property. The at least one physical property may include at least one of rigidity, elasticity, flexibility, or deformability. Flexible portion 408 may have a second degree of at least one physical property of rigidity, elasticity, flexibility, or deformability that is different from the first degree of base portion 418. For example, base portion 418 may have a degree of rigidity that allows biasing element 428 to flex under an applied force and return to a resting state (e.g., an initial position before the applied force) when the force is removed. Flexible portion 408 may have a degree of rigidity that allows flexible portion 408 to comfortably conform to the shape of an occipital region of the user's head. The degree of rigidity of biasing element 428 may be greater than the degree of rigidity of flexible portion 408.

FIG. 5A is a partial view of an example base portion 518 of a head cradle, according to at least one embodiment of the present disclosure. FIG. 5A shows one biasing element 528 that may be disposed at one lateral side of base portion 518. Biasing element 528 may be defined by slots 526 disposed on both lateral sides of biasing element 528. In additional embodiments, slots 526 may be omitted, and biasing element 528 may be a protruding end of base portion 518. Biasing element 528 may be secured to a flexible portion (e.g., flexible portion 108, 208, 308, or 408) of a head cradle by a fastener (e.g., a screw) extending through hole 530 into a threaded hole in a rigid insert (e.g., rigid insert 107, 207, or 407) of the flexible portion.

Biasing element 528 may include materials and/or dimensions that provide a level of flexibility that creates a comfortable fit for a user when donning an adjustable band including a flexible portion (e.g., flexible portion 108, 208, 308, or 408). For example, biasing element 528 may include a width 538. Width 538 may be between about 0.75 inches and about 1.5 inches. Biasing element 528 may include a length 536. Length 536 may be between about 1.0 inch and about 2.5 inches. Biasing element 528 may function as a cantilevered beam (e.g., a leaf spring) anchored at a fixed end 527. When biasing element 528 flexes due to an applied force (e.g., a tensioning of the side straps) a moment may be created about fixed end 527 causing a curvature in biasing element 528. Biasing element 528 may curve (e.g., deflect) by an amount related to (e.g., proportional to) the applied force and length 536. When a user dons an adjustable band and creates a tensioning force on the flexible portion, biasing element 528 may curve (e.g., deflect) such that the flexible portion conforms to the occipital region of the user's head creating a comfortable fit.

FIG. 5B is a partial view of an example telescoping base portion 518 of a head cradle, according to at least one embodiment of the present disclosure. FIG. 5B shows one biasing element 529 that may be disposed at one lateral side of base portion 518. Biasing element 529 may be defined by slots 526 disposed on both lateral sides of biasing element 529 and telescoping elements 540(1) . . . 540(n). Biasing element 529 may be secured to a flexible portion (e.g., flexible portion 108, 208, 308, or 408) of a head cradle by a fastener (e.g., a screw) extending through hole 530 into a threaded hole in a rigid insert (e.g., rigid insert 107, 207, or 407) of the flexible portion.

Biasing element 529 may include materials and/or dimensions that provide a level of flexibility that creates a comfortable fit for a user when donning an adjustable band including a flexible portion (e.g., flexible portion 108, 208, 308, or 408). For example, biasing element 529 may include a width 538. Width 538 may be between about 0.75 inches and about 1.5 inches. Biasing element 529 may include a length 536. Length 536 may be between about 1.0 inch and about 2.5 inches when biasing element 529 is fully extended. Biasing element 529 may include telescoping elements 540(1) . . . 540(n). Each of telescoping elements 540(1) . . . 540(n) may retract into an adjacent telescoping element to allow length 536 to vary from a fully extended position to a fully retracted position. For example, telescoping element 540(1) may retract into adjacent telescoping element 540(2) while telescoping element 540(2) may retract into adjacent telescoping element 540(n). Biasing element 529 may include springs (e.g., compression springs, plate springs, torsion springs, etc.) that extend biasing element 529 to a fully extended position. Biasing element 529 may compress telescoping elements 540(1) . . . 540(n) (e.g., shortening of length 536) due to an applied force (e.g., a tensioning of the side straps). Biasing element 529 may extend (e.g., lengthening of length 536) when the applied force is removed. The restoring force of the springs in biasing element 529 may cause telescoping elements 540(1) . . . 540(n) to return to a fully extended position. When a user dons an adjustable band and creates a tensioning force on the flexible portion, telescoping elements 540(1) . . . 540(n) of biasing element 529 may compress such that the flexible portion conforms to the occipital region of the user's head creating a comfortable fit. In some examples, base portion 518 may include both flexing movements of biasing element 528 and telescoping movements of biasing element 529.

FIG. 6 is a perspective side view of an adjustable band 600 attached to an HMD 640, according to at least one embodiment of the present disclosure. HMD 640 may include a facial interface cushion 642 and an upper strap 620. Adjustable band 600 may be configured to attach to/detach from HMD 640. Adjustable band 600 may include right strap 606 that may be attached, affixed, connected, or otherwise coupled to HMD 640. In some examples, a snap piece assembly 604 may be connected to the right strap 606 connecting an end of adjustable band 600 to HMD 640. Similarly, adjustable band 600 may include left strap 614 that may be attached, affixed, connected, or otherwise coupled to HMD 640. In some examples, a snap piece assembly 616 may be connected to the left strap 614 connecting an end of adjustable band 600 to HMD 640.

As described above, fasteners may provide for the detachable connection of adjustable band 600 to HMD 640. For example, with reference to FIGS. 1, 6, and 8, snap piece assembly 616 and snap piece assembly 604 may provide a detachable connection of adjustable band 600 to HMD 640. The ability to provide a detachable connection of adjustable band 600 to HMD 640 may allow for the swapping and/or replacement of different adjustable bands on HMD 640.

HMD 640 may be worn by a user by placing HMD 640 on a head of the user so that HMD 640 covers a field of view of the user and facial interface cushion 642 rests comfortably against a region (e.g., a forehead) of a face of the user. When worn in this manner by the user, with right strap 606 and left strap 614 extending back from HMD 640, adjustable band 600 may be positioned on the head of the user so that flexible portion 608 of head cradle 609 rests comfortably on the occipital region of the user's head. Additional support may be provided by upper strap 620.

In some examples, flexible portion 608 may conform to the occipital region of the user's head when a force is applied to base portion 618. For example, a force substantially normal to the surface of the user's head and in a direction towards the rear of the user's head may be applied by tensioning device 612. A user may don adjustable band 600 that is attached to HMD 640 by snap piece assembly 616 and snap piece assembly 604. The user may adjust the tension of adjustable band 600 by adjusting a position (e.g., rotating, sliding, etc.) of adjustment knob 610. An increase in tension on adjustable strap 600 may create a force between flexible portion 608 and the rear portion of the user's head that contacts flexible portion 608. Flexible portion 608 may conform to the shape of the rear portion of the user's head and distribute the force substantially even across the surface of flexible portion 608 that contacts the rear portion of the user's head. When adjustable strap 600 is tensioned, flexible portion 608 may apply a force to biasing element 628. When biasing element 628 flexes due to the applied force (e.g., a tensioning of right strap 606 and left strap 614) a moment may be created about the fixed end of biasing element 628 (e.g., fixed to base portion 618), resulting in a curvature in biasing element 628. Biasing element 628 may curve (e.g., deflect) by an amount related to the applied force. When a user dons adjustable band 600 and creates a tensioning force on the flexible portion, biasing element 628 may curve (e.g., deflect) such that flexible portion 608 conforms to the occipital region of the user's head creating a comfortable fit.

In some examples, a housing of tensioning device 612 may support a battery 644 (e.g., a rechargeable battery). Battery 644 may supply power (e.g., supplemental power) to HMD 640. For example, power from battery 644 may be supplied to HMD 640 through battery cable 643. Battery 644 may add additional weight to tensioning device 612. Head cradle 609 including flexible portion 608 and base portion 618 may mitigate the effects of the additional weight by conforming to the occipital region of the user's head creating a comfortable fit.

As shown in FIG. 6, upper strap 620 may be coupled to flexible portion 608 of head cradle 609. In additional embodiments, upper strap 620 may instead be coupled to the housing of tensioning device 612. In addition, in some examples upper strap 620 may be removable and/or omitted.

FIGS. 7A-7D illustrate various hinge mechanisms 700A-700D that may be used to attach a flexible portion 702 of a head cradle to a base portion 704 of the head cradle, according to various embodiments of the present disclosure. In some embodiments, hinge mechanisms 700A-700D may be used in conjunction with any of biasing elements 220, 221, 315, 316, 428, 528, 529, 628. In additional embodiments, hinge mechanisms 700A-700D may be used in place of biasing elements 220, 221, 315, 316, 428, 528, 529, 628 to provide some flexibility between flexible portion 702 and base portion 704 of the head cradle without including biasing elements 220, 221, 315, 316, 428, 528, 529, 628.

Figure 7A:
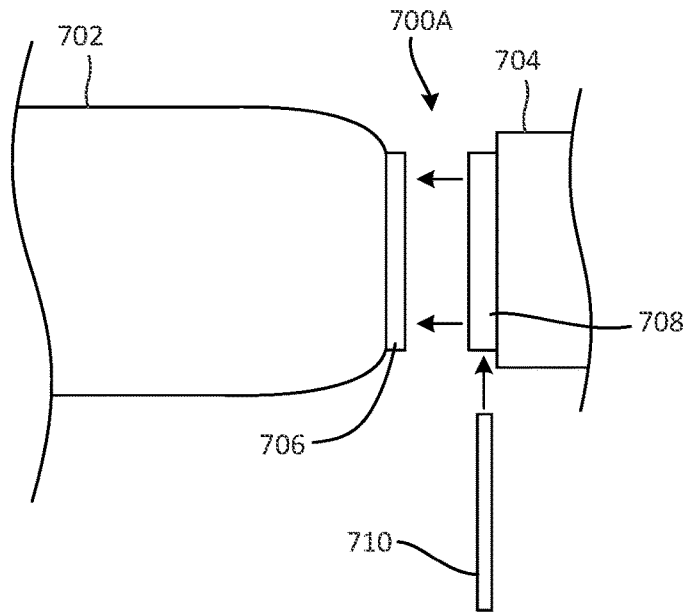
FIGS. 7A-7D illustrate various hinge mechanisms that may be used to attach a flexible portion of a head cradle to a base portion of the head cradle, according to various embodiments of the present disclosure.

As shown in FIG. 7A, a first hinge member 706A may be coupled to flexible portion 702 of hinge 700A a second hinge member 708A that is complementary to first hinge member 706A may be coupled to base portion 704. First hinge member 706A and second hinge member 708A may, when assembled, be configured to allow at least some mutual rotation of flexible portion 702 and base portion 704.

Hinge 700A may have any suitable configuration. By way of example, hinge 700A may include a pin 710 that rotatably secures first hinge member 706A to second hinge member 708A, similar to a watchband hinge or a door hinge. In additional examples, hinge 700A may be or include a C-snap hinge, a ball joint, a living hinge, an elastomeric hinge, a spring element, or any other suitable hinge 700A. Some non-limiting examples of hinge configurations that may be used as hinge 700A are shown and described with reference to FIGS. 7B-7D.

Hinge 700A may be configured to rotate in one or more rotational directions, such as to accommodate various head shapes and sizes. For example, hinge 700A may be configured to allow rotation between flexible portion 702 and base portion 704 in a substantially horizontal direction (e.g., from the perspective of FIG. 7A, which may be about a substantially vertical axis when the head cradle is worn by a user with a corresponding head strap in a horizontal orientation). Rotation in a perpendicular direction (e.g., vertical rotation about a horizontal axis) may be inhibited by hinge 700A. In this case, hinge 700A may be configured to allow lateral rotation around a user's head to accommodate various head shapes and sizes, while maintaining an initial up-and-down orientation of the associated head cradle. In additional embodiments, hinge 700A may be configured to allow rotation in more than one rotational direction, such as in both horizontal and vertical directions.

Moreover, hinge 700A may be configured to allow rotation up to a predetermined angle (e.g., 20°, 10°, 5°, etc.), while inhibiting further rotation past the predetermined angle. Inhibiting rotation past a predetermined angle may improve a usability and structural integrity of a head cradle with hinge 700A by not allowing flexible portion 702 to rotate beyond what may be necessary to comfortably fit a variety of head shapes and sizes.

Figure 7B:
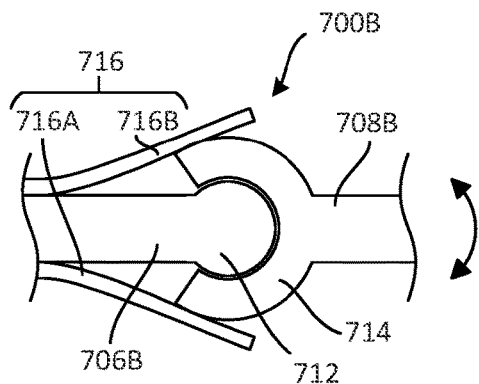

FIG. 7B illustrates a top view of a C-snap hinge 700B that may be used as hinge 700A. C-snap hinge 700B may include a first hinge member 706B that may include a generally cylindrical end portion 712 and a second hinge member 708B that may include an elongated C-shaped receptacle 714. C-shaped hinge 700B may constrain rotation between first hinge member 706B and second hinge member 708B to one rotational direction.

The elongated C-shaped receptacle 714 may be shaped and sized to receive the generally cylindrical end portion 712 of first hinge member 706B. In some embodiments, elongated C-shaped receptacle 714 may be formed of a material exhibiting sufficient flexibility to allow generally cylindrical end portion 712 to snap into elongated C-shaped receptacle 714. In some examples, C-snap hinge 700B may facilitate removability of a head cradle by unsnapping generally cylindrical end portion 712 from elongated C-shaped receptacle 714, such as for cleaning or replacement.

Optionally, C-snap hinge 700B (or any of the other hinges 700A, 700C, 700D described herein) may include a biasing member 716 for biasing the C-snap hinge 700B to a predetermined angular state. Biasing member 716 may include one or more leaf springs 716A, 716B as illustrated in FIG. 7B, compression springs, torsional springs, elastomeric bands, or the like.

Figure 7C:
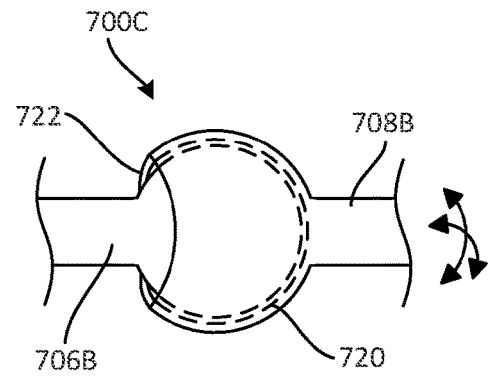

FIG. 7C illustrates a side perspective view of a ball joint hinge 700C that may be used as hinge 700A. Ball joint hinge 700C may include a first hinge member 706C that may include a generally spherical end portion 718 and a second hinge member 708C that may include a ball receptacle 720. Ball joint hinge 700C may allow rotation between first hinge member 706C and second hinge member 708C in more than one direction, such as horizontally and vertically.

Ball receptacle 720 may be shaped and sized to receive and retain generally spherical end portion 718. An opening 722 of ball receptacle 720 may be sized to enable first hinge member 706C to rotate relative to second hinge member 708C. In some examples, opening 722 may be circular to allow for equal rotation in all rotational directions. In additional examples, opening 722 may be shaped to constrain rotation in one or more directions. For example, opening 722 may be larger in a horizontal direction than in a vertical direction (e.g., opening 722 may have an elliptical shape) to allow for more horizontal rotation (e.g., up to 10°) and less vertical rotation (e.g., up to 5°).

Figure 7D:
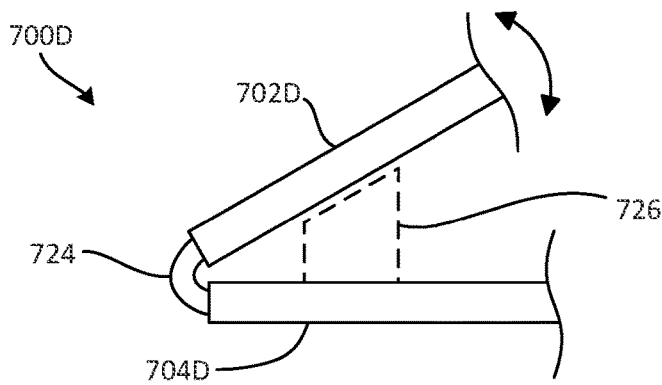

FIG. 7D illustrates a top view of a living hinge 700D that may be used as hinge 700A. Living hinge 700D may include a compliant coupler 724 that rotatably couples a flexible portion 702D to a base portion 704D of a head cradle. Living hinge 700D may allow rotation between flexible portion 702D and base portion 704D in one or more directions, such as horizontally and/or vertically.

Compliant coupler 724 may include a flexible polymer element (e.g., an elastomeric element), metallic element, or composite element that is configured to bend to allow for rotation between flexible portion 702D to base portion 704D. Compliant coupler 724 may, in some examples, exhibit biasing and/or dampening effects.

As shown in FIG. 7D, in some examples, living hinge 700D (or any of the other hinges 700A-700C) may include a stop 726 for limiting rotation to a predetermined angle. The stop 726 may be or include a rigid block, an elastomeric material, or any other suitable material or mechanism for inhibiting rotation beyond the predetermined angle.

As described in detail above, the present disclosure details systems, devices, and methods related to a head cradle for an HMD. Embodiments of the present disclosure may allow the user to rotate an adjustment knob on an adjustable band system to set the proper tension for the user when donning an HMD and provide a flexible head cradle that conforms to the rear portion (e.g., occipital region) of the user's head. The embodiments of the present disclosure allow the head cradle to conform to the user's head based on a flexible portion of the head cradle that distributes the tension across the surface of the flexible portion that contacts the user's head and biasing elements (e.g., leaf springs) of a base portion of the head cradle that flex under the applied tension. The head cradle may provide a comfortable fit for the user when donning an HMD attached to the adjustable band system.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
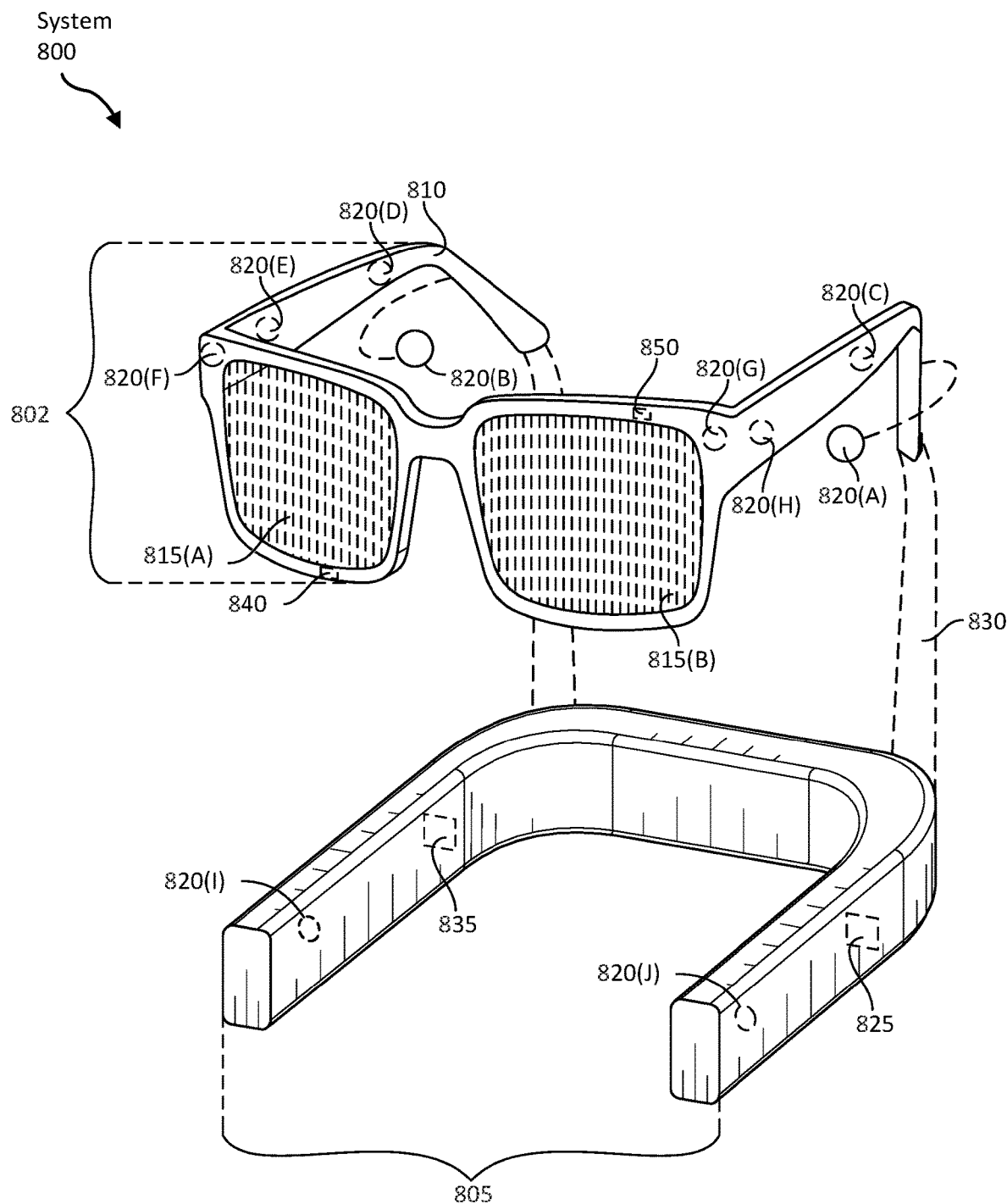
FIG. 8 is an illustration of exemplary augmented-reality glasses that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 81220 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(F) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a Bluetooth connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(I) and 820(J)) that are part of the microphone array (or potentially form their own microphone subarray). Neckband 805 may also include a controller 825 and a power source 835.

Acoustic transducers 820(I) and 820(J) of neckband 805 may be configured to detect sound and convert the detected sound into an electronic format (analog or digital). In the embodiment of FIG. 8, acoustic transducers 820(I) and 820(J) may be positioned on neckband 805, thereby increasing the distance between the neckband acoustic transducers 820(I) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 (e.g., adjustable band 100, 200, 300, 600 described above) shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

Some augmented-reality systems may map a user's and/or device's environment using techniques referred to as "simultaneous location and mapping" (SLAM). SLAM mapping and location identifying techniques may involve a variety of hardware and software tools that can create or update a map of an environment while simultaneously keeping track of a user's location within the mapped environment. SLAM may use many different types of sensors to create a map and determine a user's position within the map.

SLAM techniques may, for example, implement optical sensors to determine a user's location. Radios including WiFi, Bluetooth, global positioning system (GPS), cellular or other communication devices may be also used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. Augmented-reality and virtual-reality devices may incorporate any or all of these types of sensors to perform SLAM operations such as creating and continually updating maps of the user's current environment. In at least some of the embodiments described herein, SLAM data generated by these sensors may be referred to as "environmental data" and may indicate a user's current environment. This data may be stored in a local or remote data store (e.g., a cloud data store) and may be provided to a user's AR/VR device on demand.

When the user is wearing an augmented-reality headset or virtual-reality headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to as "localization," and the process of rendering playback of the audio source signal to appear as if it is coming from a specific direction may be referred to as "spatialization."

Localizing an audio source may be performed in a variety of different ways. In some cases, an augmented-reality or virtual-reality headset may initiate a DOA analysis to determine the location of a sound source. The DOA analysis may include analyzing the intensity, spectra, and/or arrival time of each sound at the artificial-reality device to determine the direction from which the sounds originated. The DOA analysis may include any suitable algorithm for analyzing the surrounding acoustic environment in which the artificial-reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial-reality device may provide an alignment and orientation guide, which the user may follow to customize the sound signal presented to the user based on their unique HRTF. In some embodiments, an artificial-reality device may implement one or more microphones to listen to sounds within the user's environment. The augmented-reality or virtual-reality headset may use a variety of different array transfer functions (e.g., any of the DOA algorithms identified above) to estimate the direction of arrival for the sounds. Once the direction of arrival has been determined, the artificial-reality device may play back sounds to the user according to the user's unique HRTF. Accordingly, the DOA estimation generated using the array transfer function (ATF) may be used to determine the direction from which the sounds are to be played from. The playback sounds may be further refined based on how that specific user hears sounds according to the HRTF.

In addition to or as an alternative to performing a DOA estimation, an artificial-reality device may perform localization based on information received from other types of sensors. These sensors may include cameras, IR sensors, heat sensors, motion sensors, GPS receivers, or in some cases, sensors that detect a user's eye movements. For example, as noted above, an artificial-reality device may include an eye tracker or gaze detector that determines where the user is looking. Often, the user's eyes will look at the source of the sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an "acoustic transfer function" may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial-reality device may include one or more acoustic sensors that detect sounds within range of the device. A controller of the artificial-reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial-reality device may re-render (i.e., spatialize) the sound signals to sound as if coming from the direction of that sound source. The artificial-reality device may apply filters or other digital signal processing that alter the intensity, spectra, or arrival time of the sound signal. The digital signal processing may be applied in such a way that the sound signal is perceived as originating from the determined location. The artificial-reality device may amplify or subdue certain frequencies or change the time that the signal arrives at each ear. In some cases, the artificial-reality device may create an acoustic transfer function that is specific to the location of the device and the detected direction of arrival of the sound signal. In some embodiments, the artificial-reality device may re-render the source signal in a stereo device or multi-speaker device (e.g., a surround sound device). In such cases, separate and distinct audio signals may be sent to each speaker. Each of these audio signals may be altered according to the user's HRTF and according to measurements to the user's location and the location of the sound source to sound as if they are coming from the determined location of the sound source. Accordingly, in this manner, the artificial-reality device (or speakers associated with the device) may re-render an audio signal to sound as if originating from a specific location.

As noted, artificial-reality systems 800 and 900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
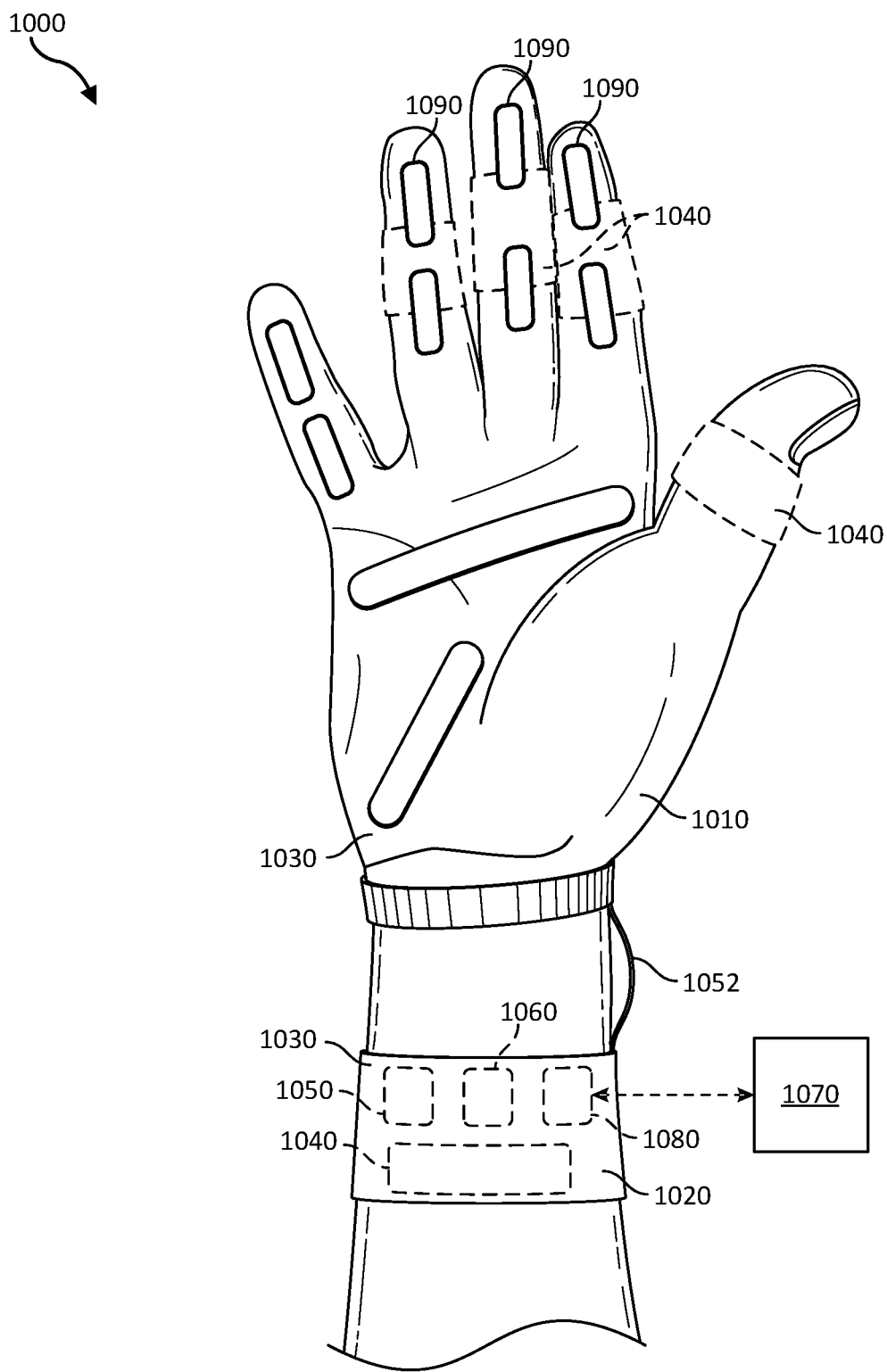
FIG. 10 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). Haptic device 1010 and haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in textile material 1030 of vibrotactile system 1000. Vibrotactile devices 1040 may be positioned in locations to provide a vibrating sensation (e.g., haptic feedback) to a user of vibrotactile system 1000. For example, vibrotactile devices 1040 may be positioned against the user's finger(s), thumb, or wrist, as shown in FIG. 10. Vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to vibrotactile devices 1040, such as via conductive wiring 1052. In some examples, each of vibrotactile devices 1040 may be independently electrically coupled to power source 1050 for individual activation. In some embodiments, a processor 1060 may be operatively coupled to power source 1050 and configured (e.g., programmed) to control activation of vibrotactile devices 1040.

Vibrotactile system 1000 may be implemented in a variety of ways. In some examples, vibrotactile system 1000 may be a standalone system with integral subsystems and components for operation independent of other devices and systems. As another example, vibrotactile system 1000 may be configured for interaction with another device or system 1070.

For example, vibrotactile system 1000 may, in some examples, include a communications interface 1080 for receiving and/or sending signals to the other device or system 1070. The other device or system 1070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1080 may enable communications between vibrotactile system 1000 and the other device or system 1070 via a wireless (e.g., Wi-Fi, Bluetooth, cellular, radio, etc.) link or a wired link. If present, communications interface 1080 may be in communication with processor 1060, such as to provide a signal to processor 1060 to activate or deactivate one or more of the vibrotactile devices 1040.

Vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although power source 1050, processor 1060, and communications interface 1080 are illustrated in FIG. 10 as being positioned in haptic device 1020, the present disclosure is not so limited. For example, one or more of power source 1050, processor 1060, or communications interface 1080 may be positioned within haptic device 1010 or within another wearable textile.

Figure 11:
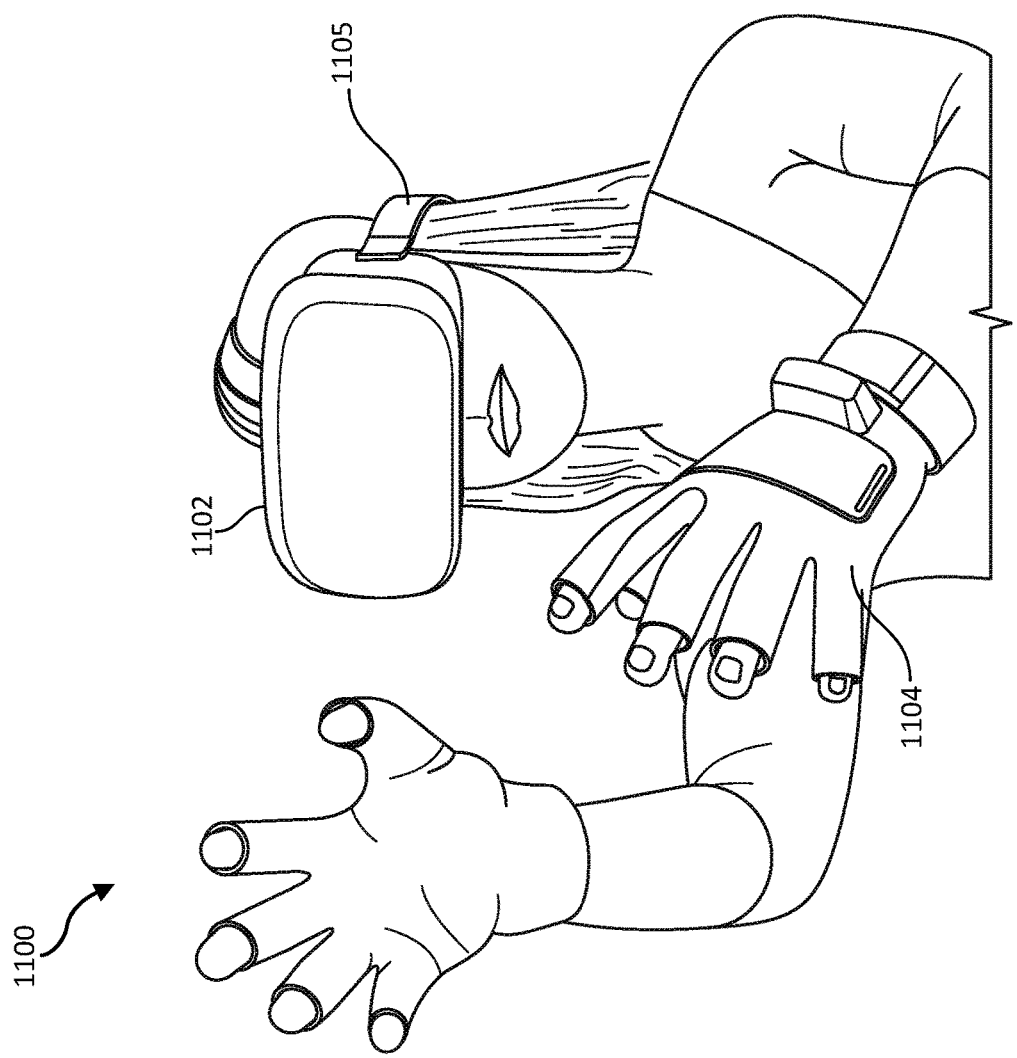
FIG. 11 is an illustration of an exemplary virtual-reality environment according to embodiments of this disclosure.

Haptic wearables, such as those shown in and described in connection with FIG. 10, may be implemented in a variety of types of artificial-reality systems and environments. FIG. 11 shows an example artificial-reality environment 1100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 9:
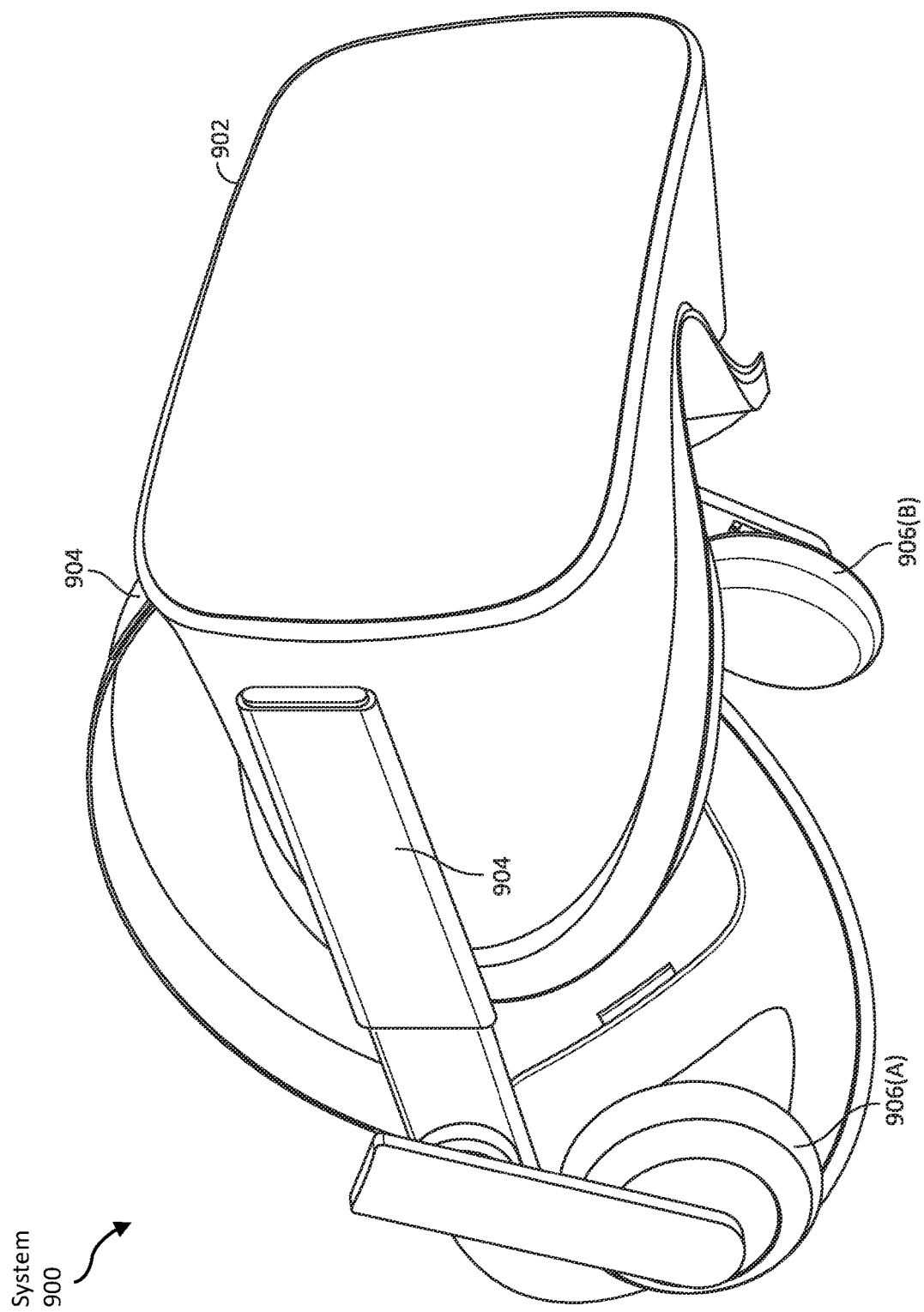
FIG. 9 is an illustration of an exemplary virtual-reality headset that may be used in connection with embodiments of this disclosure.

Head-mounted display 1102 generally represents any type or form of virtual-reality system, such as virtual-reality system 900 in FIG. 9. Head-mounted display 1102 may include an adjustable strap system 1005 (e.g., adjustable band 100, 200, 300, or 600 described above) shaped to fit around a user's head. Haptic device 1104 generally represents any type or form of wearable device, worn by a user of an artificial-reality system, that provides haptic feedback to the user to give the user the perception that he or she is physically engaging with a virtual object. In some embodiments, haptic device 1104 may provide haptic feedback by applying vibration, motion, and/or force to the user. For example, haptic device 1104 may limit or augment a user's movement. To give a specific example, haptic device 1104 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1104 to send action requests to a console. Examples of action requests include, without limitation, requests to start an application and/or end the application and/or requests to perform a particular action within the application.

Figure 12:
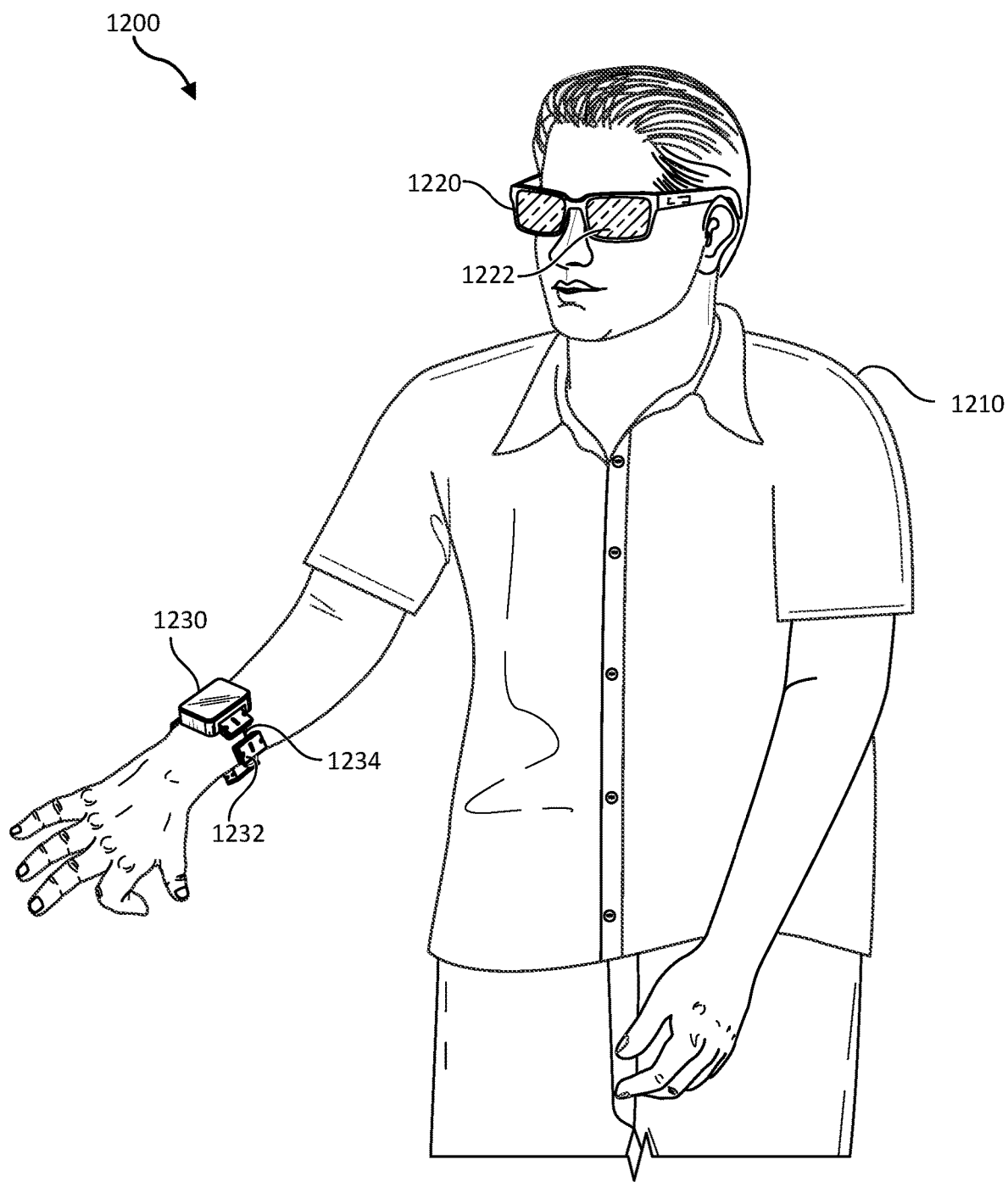
FIG. 12 is an illustration of an exemplary augmented-reality environment according to embodiments of this disclosure.

While haptic interfaces may be used with virtual-reality systems, as shown in FIG. 11, haptic interfaces may also be used with augmented-reality systems, as shown in FIG. 12. FIG. 12 is a perspective view of a user 1210 interacting with an augmented-reality system 1200. In this example, user 1210 may wear a pair of augmented-reality glasses 1220 that may have one or more displays 1222 and that are paired with a haptic device 1230. In this example, haptic device 1230 may be a wristband that includes a plurality of band elements 1232 and a tensioning mechanism 1234 that connects band elements 1232 to one another.

One or more of band elements 1232 may include any type or form of actuator suitable for providing haptic feedback. For example, one or more of band elements 1232 may be configured to provide one or more of various types of cutaneous feedback, including vibration, force, traction, texture, and/or temperature. To provide such feedback, band elements 1232 may include one or more of various types of actuators. In one example, each of band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1010, 1020, 1104, and 1230 may include any suitable number and/or type of haptic transducer, sensor, and/or feedback mechanism. For example, haptic devices 1010, 1020, 1104, and 1230 may include one or more mechanical transducers, piezoelectric transducers, and/or fluidic transducers. Haptic devices 1010, 1020, 1104, and 1230 may also include various combinations of different types and forms of transducers that work together or independently to enhance a user's artificial-reality experience. In one example, each of band elements 1232 of haptic device 1230 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A head cradle including a flexible portion that is configured to conform to an occipital region of a user's head and a base portion comprising at least one mounting element that is configured to secure the head cradle to a head strap for supporting a head-mounted display, a first biasing element secured to a first side of the flexible portion, and a second biasing element secured to a second, opposite side of the flexible portion, wherein the first and second biasing elements are configured to allow the flexible portion to conform to the occipital region of the user's head when a force substantially normal to the user's head is applied to the base portion.

Example 2: The head cradle of Example 1, wherein the first side of the flexible portion is positioned to be disposed proximate to a first lateral side of the user's head when the head cradle is donned and the second, opposite side of the flexible portion is positioned to be disposed proximate to a second lateral side of the user's head that is opposite the first lateral side when the head cradle is donned.

Example 3: The head cradle of Example 1 or Example 2, wherein the first biasing element comprises a first leaf spring and the second biasing element comprises a second leaf spring.

Example 4: The head cradle of any of Examples 1 through 3, wherein each of the first leaf spring and the second leaf spring has a width between about 0.75 inches and about 1.5 inches.

Example 5: The head cradle of any of Examples 1 through 4, wherein the first leaf spring is defined by at least one slot in the base portion and the second leaf spring is defined by at least one other slot in the base portion.

Example 6: The head cradle of any of Examples 1 through 5, wherein each of the at least one slot and the at least one other slot has a length between about 1.0 inches and about 2.5 inches.

Example 7: The head cradle of any of Examples 1 through 6, wherein the head cradle comprises a flexible thermoplastic polyurethane material.

Example 8: The head cradle of any of Examples 1 through 7 wherein the head cradle comprises a material having a loop shape.

Example 9: The head cradle of any of Examples 1 through 8, wherein the base portion comprises a material having a higher rigidity than a material of the flexible portion of the head cradle.

Example 10: The head cradle of any of Examples 1 through 9, wherein the flexible portion is secured to the base portion solely by the first and second biasing elements.

Example 11: The head cradle of any of Examples 1 through 10, wherein the flexible portion further comprises a first insert molded metal material disposed at the first side of the flexible portion and a second insert molded metal material disposed at the second, opposite side of the flexible portion, wherein the first insert molded metal material is configured to couple the first side of the flexible portion to the first biasing element and the second insert molded metal material is configured to couple the second, opposite side of the flexible portion to the second biasing element.

Example 12: An adjustable band for a head-mounted display (HMD), including a flexible portion that is configured to conform to an occipital region of a user's head when the HMD is donned by the user, a base portion comprising a first biasing element secured to a first side of the flexible portion, and a second biasing element secured to a second, opposite side of the flexible portion, a tensioning device that is secured to the base portion, the tensioning device comprising a tension adjustment knob, a first strap configured to extend from a first side of the HMD to a first side of the tensioning device, and a second strap configured to extend from a second, opposite side of the HMD to a second, opposite side of the tensioning device, wherein the tensioning device is configured to adjust a tension of at least one of the first strap or the second strap by rotation of the tension adjustment knob and the first and second biasing elements are configured to allow the flexible portion to conform to the occipital region of the user's head when the tension is applied.

Example 13: The adjustable band of Example 12, wherein the tensioning device further comprises a housing that has a higher rigidity than the flexible portion.

Example 14: The adjustable band of Example 12 or Example 13, further comprising a battery positioned within the housing of the tensioning device, wherein the battery is configured to provide power to the HMD.

Example 15: The adjustable band of any of Examples 12 through 14, wherein the flexible portion comprises a thermoplastic polymer material.

Example 16: The adjustable band of any of Examples 12 through 15, wherein the flexible portion is supported by the first biasing element and the second biasing element in a position to form an air gap between the flexible portion and the tensioning device.

Example 17: adjustable band of any of Examples 12 through 16, wherein the HMD comprises a right side arm and a left side arm, the first strap comprises a first fastener, the second strap comprises a second fastener, the first fastener is configured to detachably secure the first strap to the right side arm of the HMD, and the second fastener is configured to detachably secure the second strap to the left side arm of the HMD.

Example 18: The adjustable band of any of Examples 12 through 17, further comprising a top strap extending from a top portion of the flexible portion to a top portion of the HMD.

Example 19: The adjustable band of any of Examples 12 through 18, wherein the HMD is configured to be supported on the user's head by abutting solely a facial interface of the HMD, the top strap, and the flexible portion against the user's head.

Example 20: A detachable band system for a head-mounted display (HMD), including a flexible portion that is configured to conform to an occipital region of a user's head when the HMD is donned by the user, a base portion comprising a first biasing element secured to a first side of the flexible portion and a second biasing element secured to a second, opposite side of the flexible portion, a tensioning device that is secured to the base portion, a first fastener configured to detachably secure a first strap to a right side arm of the HMD, a second fastener configured to detachably secure a second strap to a left side arm of the HMD, wherein the tensioning device is configured to adjust a tension of at least one of the first strap or the second strap and the first and second biasing elements are configured to allow the flexible portion to conform to the occipital region of the user's head when the tension is applied.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head cradle comprising:
a flexible portion that is configured to conform to an occipital region of a user's head; and
a base portion comprising:
at least one mounting element that is configured to secure the head cradle to a head strap for supporting a head-mounted display,
a first biasing element comprising a first leaf spring defined in a central portion of the base portion by at least one slot in the base portion, the first biasing element secured to a first side of the flexible portion, and
a second biasing element comprising a second leaf spring defined in another central portion of the base portion by at least one other slot in the base portion, the second biasing element secured to a second, opposite side of the flexible portion, wherein the first and second biasing elements are configured to allow the flexible portion to conform to the occipital region of the user's head when a force substantially normal to the user's head is applied to the base portion.

2. The head cradle of claim 1, wherein:
the first side of the flexible portion is positioned to be disposed proximate to a first lateral side of the user's head when the head cradle is donned; and
the second, opposite side of the flexible portion is positioned to be disposed proximate to a second lateral side of the user's head that is opposite the first lateral side when the head cradle is donned.

3. The head cradle of claim 1, wherein each of the first leaf spring and the second leaf spring has a width between about 0.75 inches and about 1.5 inches.

4. The head cradle of claim 1, wherein each of the at least one slot and the at least one other slot has a length between about 1.0 inches and about 2.5 inches.

5. The head cradle of claim 1, wherein the head cradle comprises a flexible thermoplastic polyurethane material.

6. The head cradle of claim 1, wherein the head cradle comprises a material having a loop shape.

7. The head cradle of claim 1, wherein the base portion comprises a material having a higher rigidity than a material of the flexible portion of the head cradle.

8. The head cradle of claim 1, wherein the flexible portion is secured to the base portion solely by the first and second biasing elements.

9. The head cradle of claim 1, wherein the flexible portion further comprises:
a first insert molded metal material disposed at the first side of the flexible portion; and
a second insert molded metal material disposed at the second, opposite side of the flexible portion, wherein:
the first insert molded metal material is configured to couple the first side of the flexible portion to the first biasing element, and
the second insert molded metal material is configured to couple the second, opposite side of the flexible portion to the second biasing element.

10. The adjustable band of claim 1, wherein the first leaf spring is defined by two slots in the base portion respectively extending along opposing sides of the first leaf spring and the second leaf spring is defined by two other slots in the base portion respectively extending along opposing sides of the second leaf spring.

11. The adjustable band of claim 1, wherein the at least one slot is defined in part by a section of the base portion extending along the first leaf spring and the at least one other slot is defined in part by another section of the base portion extending along the second leaf spring.

12. An adjustable band for a head-mounted display (HMD), comprising:
a flexible portion that is configured to conform to an occipital region of a user's head when the HMD is donned by the user;
a base portion comprising:
a first biasing element comprising a first leaf spring defined in a central portion of the base portion by at least one slot in the base portion, the first biasing element secured to a first side of the flexible portion, and
a second biasing element comprising a second leaf spring defined in another central portion of the base portion by at least one other slot in the base portion, the second biasing element secured to a second, opposite side of the flexible portion;
a tensioning device that is secured to the base portion, the tensioning device comprising a tension-adjustment knob;
a first strap configured to extend from a first side of the HMD to a first side of the tensioning device; and
a second strap configured to extend from a second, opposite side of the HMD to a second, opposite side of the tensioning device, wherein:
the tensioning device is configured to adjust a tension of at least one of the first strap or the second strap by rotation of the tension adjustment knob, and
the first and second biasing elements are configured to allow the flexible portion to conform to the occipital region of the user's head when the tension is applied.

13. The adjustable band of claim 12, wherein the tensioning device further comprises a housing that has a higher rigidity than the flexible portion.

14. The adjustable band of claim 13, further comprising a battery positioned within the housing of the tensioning device, wherein the battery is configured to provide power to the HMD.

15. The adjustable band of claim 12, wherein the flexible portion comprises a thermoplastic polymer material.

16. The adjustable band of claim 12, wherein the flexible portion is supported by the first biasing element and the second biasing element in a position to form an air gap between the flexible portion and the tensioning device.

17. The adjustable band of claim 12, wherein:
the first strap comprises a first fastener;
the second strap comprises a second fastener;
the first fastener is configured to detachably secure the first strap to a right side arm of the HMD; and
the second fastener is configured to detachably secure the second strap to a left side arm of the HMD.

18. The adjustable band of claim 12, further comprising a top strap configured to extend from a top portion of the flexible portion to a top portion of the HMD.

19. The adjustable band of claim 18, wherein solely the top strap and the flexible portion are configured to support the HMD on the user's head in conjunction with a facial interface of the HMD.

20. A detachable band system for a head-mounted display (HMD), comprising:
a flexible portion that is configured to conform to an occipital region of a user's head when the HMD is donned by the user;
a base portion comprising:
a first biasing element comprising a first leaf spring defined in a central portion of the base portion by at least one slot in the base portion, the first biasing element secured to a first side of the flexible portion, and a second biasing element comprising a second leaf spring defined in another central portion of the base portion by at least one other slot in the base portion, the second biasing element secured to a second, opposite side of the flexible portion;

a tensioning device that is secured to the base portion;

a first fastener configured to detachably secure a first strap to a right side arm of the HMD;

a second fastener configured to detachably secure a second strap to a left side arm of the HMD, wherein:

the tensioning device is configured to adjust a tension of at least one of the first strap or the second strap, and the first and second biasing elements are configured to allow the flexible portion to conform to the occipital region of the user's head when the tension is applied.

* * * * *